United States Patent [19]

Tuck

[11] 4,342,307
[45] Aug. 3, 1982

[54] SOLAR COLLECTOR FOR HEATING AIR

[76] Inventor: John W. Tuck, 01 Squam Hill Ct., Rockport, Mass. 01966

[21] Appl. No.: 215,018

[22] Filed: Dec. 10, 1980

[51] Int. Cl.³ ............................................... F24J 3/02
[52] U.S. Cl. ..................................... 126/449; 126/901
[58] Field of Search ................ 126/449, 450, 901, 428

[56] References Cited

U.S. PATENT DOCUMENTS

| | | | |
|---|---|---|---|
| 3,875,925 | 4/1975 | Johnston | 126/449 X |
| 4,095,428 | 6/1978 | Warren | 126/449 |
| 4,119,083 | 10/1978 | Heyen et al. | 126/449 |
| 4,129,117 | 12/1978 | Harvey | 126/271 |
| 4,212,292 | 7/1980 | Reinert | 126/449 |
| 4,237,867 | 12/1980 | Bauer | 126/441 |
| 4,243,021 | 1/1981 | Homsy et al. | 126/449 |

FOREIGN PATENT DOCUMENTS 2629086  1/1978  Fed. Rep. of Germany ...... 126/449

Primary Examiner—Samuel Scott
Assistant Examiner—Randall L. Green
Attorney, Agent, or Firm—Kenway & Jenney

[57] ABSTRACT

A solar collector for heating air has an energy transfer element within an air passage. A screen to which granules are secured forms the transfer element and provides a rough, coarse surface of large topographical area for enhanced air heating.

5 Claims, 4 Drawing Figures

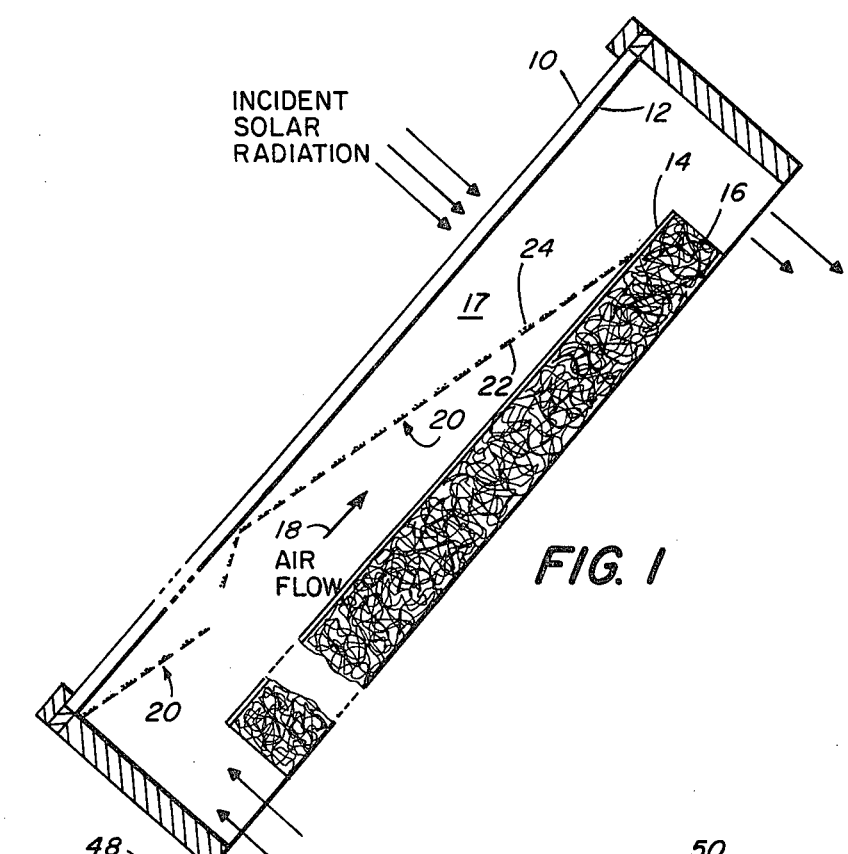
FIG. 1
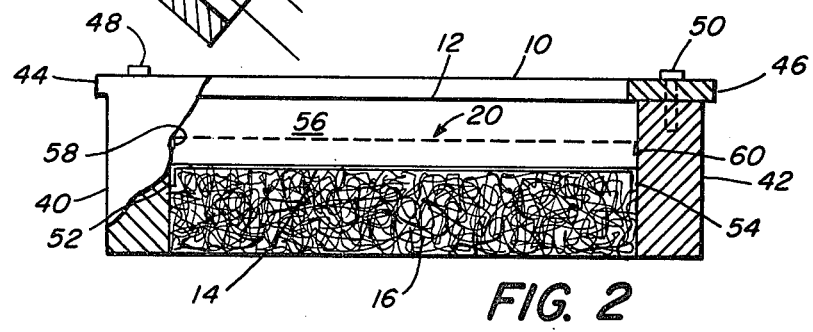
FIG. 2
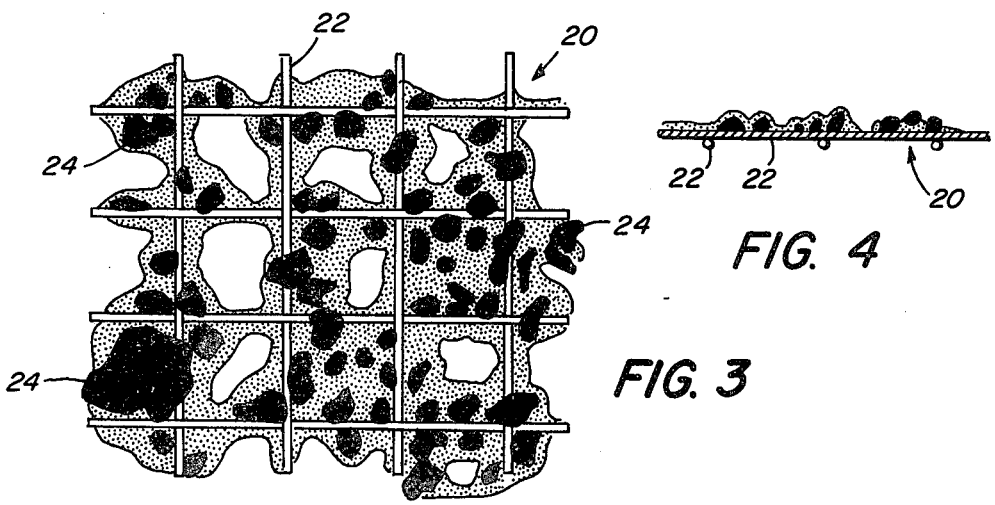
FIG. 3
FIG. 4

SOLAR COLLECTOR FOR HEATING AIR

BACKGROUND OF THE INVENTION

This invention relates to solar collectors and more particular to a solar collector for heating air or other gas.

Solar collectors absorb radiant energy from the sun and deliver heat to a working medium such as air or water. The heated medium is typically used for space heating purposes, and can also provide domestic hot water. A solar collector for heating air typically has an air passage with a glazing layer forming the passage wall that is exposed to the sun. A transfer element is disposed within the passage to absorb solar energy, transform it to heat, and deliver the resultant heat to air in the passage. The transformation converts sunlight, which is radiant energy of relatively short wavelength, to heat, which is radiant energy of longer wavelength.

The transfer element ideally has a large energy-absorbing surface for illumination by the sun, sufficient thermal conductivity for efficient heat delivery, and a large surface for exposure to the flow within the passage of the air that is to be heated. The transfer element in addition is to be low in cost, easy to handle and install in various collector configurations and orientations, and resistant to deterioration with age and under the relatively extreme thermal cycling that occurs between a sunny day and night, as well as between winter and summer. Known transfer elements for hot air solar collectors include finned metal structures, screens, and fibrous structures. Some examples appear in U.S. Pat. Nos. 4,129,117; 4,119,083; 4,095,428; and 3,875,925.

An object of this invention is to provide a solar collector for heating air and which has improved energy transferring efficiency in the sense that it transfers to the air a relatively high percentage of incident solar energy. Further objects are that the collector be relatively low in cost, and provide prolonged use with little if any maintenance.

It is also an object of the invention to provide an energy transfer element for providing a solar collector with the above features, and more particularly which has a large energy-transferring surface relative to the size of the surface. That is, the transfer element is to have such a rough and coarse surface topography that the area of the physical surface is significantly larger than a smooth surface of like peripheral size or dimensions.

Another object of the invention is to provide a solar collector transfer element through which the working medium can flow readily in either direction, which can be mounted in any selected orientation relative to the earth's gravitational field, and which is comparatively light in weight and of low volume.

Yet another object is to provide such a solar collector, and a transfer element therefor, which is of relatively low cost to manufacture and to install and which has a relatively long operating life with low maintenance.

Other objects of the invention will in part be obvious and will in part appear hereinafter.

SUMMARY OF THE INVENTION

A hot air solar collector according to the invention has an energy transfer element that has a large surface area for both solar illumination and for heat delivery to the air. Further, the transfer element has sufficient thermal conductivity for efficient operation yet is relatively light in weight and is amply pervious to the flow of the air being heated. Further features of the energy transfer element are relatively low cost manufacture, ease of installation, suitability for any orientation, and long useful life with minimal maintenance.

The energy transfer element is within a passage through which the air being heated flows and which is bounded on a front side by a glazing layer arranged for exposure to the sun. The transfer element is, in one preferred form, a relatively pliable panel-like structure that interrupts the air path along the passage. The panel-like structure can span across the passage, suitably one or more times in a zig-zag like fashion, to interrupt the air path therein one or more times.

The transfer element is made with a porous screen-like matrix to which mineral particles or granules are secured, generally with an overall continuous distribution. The program matrix and the granules together provide a surface of large topographical area, generally of a rough, coarse texture, for exposure both to solar illumination and to air in the passage. The transfer element hence has the desired surface for absorbing solar energy and for the delivery of heat energy to the air flowing in the passage. A preferred matrix employs a thermally conductive material, e.g. is a metal screen, to enhance the delivery of heat to the air with minimal hot or cold spots, which are considered undesirable for optimum efficiency. An adhesive, preferably which absorbs sunlight and conducts heat, can secure the mineral particles to the matrix.

The invention accordingly comprises the features of construction, combination of elements and arrangement of parts exemplified in the embodiment set forth, and the scope of the invention is indicated in the claims.

BRIEF DESCRIPTION OF DRAWINGS

For a fuller understanding of the nature and objects of the invention, reference should be made to the following detailed description and the accompanying drawings, in which:

FIG. 1 is a fragmentary side cross-sectional view of a solar collector embodying the invention;

FIG. 2 is an end view, partly broken away, of the solar collector of FIG. 1;

FIG. 3 is a fragmentary schematic plan representation, greatly enlarged, of the energy transfer element of the collector of FIG. 1; and FIG. 4 is a side sectional view, also enlarged, of the energy transfer element as shown in FIG. 3.

DESCRIPTION OF PREFERRED EMBODIMENT

FIG. 1 shows an air heating solar collector according to the invention as installed for example on a roof for exposure to solar radiation. The solar collector includes two glazing panels 10 and 12 through which solar radiation passes, e.g. which are at least translucent. The panels 10 and 12, which are at the environmentally exposed front of the collector, are separated by an insulating air gap. Well spaced from the frontal panels, at the rear of the solar collector, is a backing panel 14. The panel 14 surface facing the glazing panels has a surface characteristic, e.g. a black mat finish, which renders it highly absorptive of solar radiation. A layer of insulation 16 behind the backing panel 14 retards the flow of heat from the panel 14. The glazing panel 12 and the backing panel 14 form opposite walls of a channel or passage 17 through which air to be heated flows, as designated with arrow 18. The air flow can of course be directed in the opposite direction from that shown.

A perforate energy transfer element 20 is suspended within the passage 17 spanning across the passage, between the glazing panel 12 and the back panel 14, so that the air flow within the collector channel 17 must pass through the element 20. The collector can have a single span of the energy transfer element 20 extending across the passage 17, e.g. extending from the back panel 14 at the collector upper end to the glazing panel 12 at the collector lower end. Alternatively, the element 20 can zig-zag back and forth across the collector 20, as FIG. 1 illustrates.

The energy transfer element 20 has a perforate, supporting panel-like matrix structure onto which granules 24 are secured. The granules preferably are thermally conductive. Each granule in essence functions as a separate energy transferring element, in that it absorbs sunlight incident on any facet, converts that solar energy to heat and conducts the heat to other facets, from which it is delivered—either directly or indirectly—to the air. The granules and the matrix structure together have a surface of large topographical area for exposure to solar radiation which illuminates the collector. The element 20 accordingly absorbs, and converts to heat, a large portion of the solar energy incident on the collector. The large topographical surface of the transfer element in addition enables it to deliver the resultant heat to the air flow through it. Conductivity within the element, from surface portions which the sun illuminates to non-illuminated surface portions exposed to the air, enhances the transfer of heat to the air flow. The many-sided configuration and thermal conductivity of the granules 24 are particularly effective in this aspect of the energy transfer.

Hence, the composite of the granules and the perforate matrix effectively absorbs incident solar radiation and efficiently transfers the resultant thermal energy to the air flow. The transfer element imparts significant temperature increase to the air, but the structure of the transfer element enables it to provide this operation without an undue temperature increase of the element itself, which would result in inefficient heat loss. The transfer element can provide the foregoing operation of the collector with a relatively slow air stream in the passage, as desirable in many installations.

Solar illumination which the transfer element does not absorb and hence which reaches the backing panel 14 of the collector is, to the extent it is not reflected, absorbed by the backing panel and at least in major part converted to heat. The insulation 16 behind the panel 14 retards the loss of heat from the collector and enhances the delivery of the resultant heat from the panel to the air flow within the passage of the collector.

FIG. 2 further illustrates a typical installation of the solar collector between roof rafters 40 and 42 as might be found on a conventional house. The glazing panels 10 and 12 are maintained spaced apart, e.g. by 0.75 inch, by battens 44 and 46, and are secured to the rafters by screws or like fasteners 48 and 50. Although the panels 10 and 12 may be of any translucent or transparent glazing material such as ordinary window glass, a preferred material is a fiberglass glazing material marketed under the designation "Sunlite" by Kalwall, Inc. Adhesive and calking may additionally be used to secure and seal the glazing panels. The backing panel 14 preferably has a blackened surface facing the passage 17 as provided, for example, by heavy grade fire-retardant black construction paper. The illustrated backing panel is secured between the rafters 40 and 42 by staples or like fasteners applied at folded edge lips 52 and 54. This construction forms a passage 17 that is essentially airtight, except at the entry and exit ducts at either end, as FIG. 1 shows. The heat transfer element 20 likewise can be stapled or similarly fastened between the rafters 40 and 42 by means of folded selvage-like lip portions 58 and 60 of the matrix 22. The insulation 16 can be fiberglass or other commercially-available insulating panel, or the like.

The energy transfer element 20 is now described further with reference to FIGS. 3 and 4. The illustrated perforate matrix 22 is conventional 14/18 mesh black anodized window screen, preferably of metal such as aluminum. Screens of other materials are also well suited for practice of the invention, including copper and fiberglass, although metal or other heat-conductive material is considered preferable. The illustrated energy-transferring granules 24 are preferably mineral. One preferred mineral granule 24 is a sand blasting grit, such as the "Black Beauty" brand marketed by H. B. Reed Company. This material is a wet bottom boiler slag which is a residue from the combustion of bituminous coal. It consists approximately of 23% ferrous oxide, 42% silica, 21% aluminum oxide, 7% calcium oxide, and 7% other materials. The preferred size of the granules is 20/40 mesh. Such mineral granules have a high heat conductivity and in the 20/40 mesh size or the like present a significant surface area to the air which flows through the heat transfer element 20. Other heat-absorptive, e.g. black, granular mineral materials with significant heat conductivity, such as iron scale and black sand, can also be used in the practice of the invention. These and other granules which are thermally conductive and fire resistant are often considered waste materials; hence they are available for use in the transfer element 20 essentially without energy or other manufacturing cost.

The granules 24 of the illustrated transfer element 20 are secured to the matrix 22 by an adhesive. The adhesive preferably is present in a restricted quantity which only tacks granules in place, leaving some granule surfaces openly exposed, or covered only with a thin adhesive film. A suitable adhesive is marketed under the designation Rhoplex AC-388/50% latex base manufactured by the Rohm & Haas Company. This latex material preferably is mixed with commercial lamp black, typically at the rate of one pound lamp black per gallon of latex, to improve its energy absorptive properties. Other blackened adhesives can be used as well. It is desired that the adhesive also be heat conductive. It is considered preferable that the granules and latex be used in a quantity so that at least one-third to two-thirds of the holes in the matrix-forming screen remain open, unsealed by the granule-adhesive combination.

In the operation of an air heating solar collector according to the invention, incident solar radiation passes through the glazing panels 10 and 12 and impinges on the transfer element 20. The blackened adhesive and the black absorptive granules 24, as well as the exposed material of the screen-like matrix 22, absorb a substantial portion of the illuminating incident radiation and convert it to heat. Incident solar radiation which passes through the transfer element 22 is absorbed and converted to heat by the absorptive backing panel 14. The transfer element transfers the solar originated heat to the air flowing through the element 20, whether moved by gravity or propelled by blowers (not shown). The large surface area of the granules 24 together with the matrix 22, relative to their volume, enables the transfer element to effect this heat transfer from the solar radiation to the air flow with relatively high efficiency. Yet the transfer element 20 offers relatively little resistance to the movement of the air within the passage 17. The air also picks up heat as it flows over the backing panel 14.

The foregoing transfer element 20 can be manufactured at comparatively low cost, can be light in weight and readily shaped and hence is easy to handle for fabrication into a solar collector, and readily accommodates thermally-induced stress. Also, the illustrated heat transfer element 20 can span relatively large areas. Further, the heat transfer element has a long operating life with virtually no maintenance and can readily be of fire-resistant materials.

It will thus be seen that the objects set forth above, among those made apparent from the preceding description, are efficiently attained. Since certain changes may be made in carrying out the above constructions and articles without departing from the scope of the invention, it is intended that all matter contained in the above description or shown in the accompanying drawings be interpreted as illustrative and not in a limiting sense.

It is also to be understood that the following claims are intended to cover generic and specific features of the invention herein described, and all statements of the scope of the invention which as a matter of language might be said to fall therebetween.

Having described the invention, what is claimed as new and secured by Letters Patent is:

1. In a solar collector for heating air or other gaseous medium and having a gas passage bounded on one side by a glazing layer arranged for exposure to the sun, and having an energy absorbing and transferring element within said passage, the improvement in which said transfer element comprises
   A. a screen of thermally conductive material apertured for the ready passage of the gaseous medium and disposed for solar illumination through the glazing layer and to intercept the flow of the gaseous medium along said passage, and
   B. granules of mineral grit fixedly secured to said screen with substantially continuous distribution thereover, said granules being configured and arranged to provide said transfer element with a coarse-textured, energy-transferring surface of enhanced topographical area in which separate ones of said granules function substantially as separate energy-transferring elements.

2. In a solar collector according to claim 1, the improvement further comprising a sunlight-absorptive adhesive adhering said granules to said screen.

3. In a solar collector according to any of claims 1 or 2, the further improvement in which said screen is of metallic material.

4. In a solar collector according to claim 1, the further improvement in which at least the major portion of said granules are of a 20/40 mesh size.

5. In a solar collector according to claim 1, the further improvement in which said granules are of material selected from the group consisting of bituminous coal residue, iron scale, and black sand, and are principally of 20/40 mesh size.

* * * * *

UNITED STATES PATENT AND TRADEMARK OFFICE
CERTIFICATE OF CORRECTION

PATENT NO. : 4,342,307
DATED : August 3, 1982
INVENTOR(S) : John W. Tuck

It is certified that error appears in the above-identified patent and that said Letters Patent are hereby corrected as shown below:

Column 2, line 19, change "program" to --porous--.

Signed and Sealed this

Twenty-second Day of March 1983

[SEAL]

Attest:

GERALD J. MOSSINGHOFF

Attesting Officer

Commissioner of Patents and Trademarks